United States Patent
Koguchi

(10) Patent No.: US 8,002,288 B2
(45) Date of Patent: Aug. 23, 2011

(54) TIRE ATTITUDE CONTROL DEVICE AND METHOD

(75) Inventor: Noritaka Koguchi, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 189 days.

(21) Appl. No.: 12/467,888

(22) Filed: May 18, 2009

(65) Prior Publication Data

US 2009/0302560 A1    Dec. 10, 2009

(30) Foreign Application Priority Data

Jun. 4, 2008  (JP) .................................. 2008-147259

(51) Int. Cl.
B60G 3/26 (2006.01)

(52) U.S. Cl. .................... 280/5.521; 200/86.751; 701/37

(58) Field of Classification Search ............... 280/5.521, 280/86.751; 701/36, 37; 73/146
See application file for complete search history.

(56) References Cited

U.S. PATENT DOCUMENTS

| | | | | |
|---|---|---|---|---|
| 6,279,920 | B1* | 8/2001 | Choudhery | 280/5.521 |
| 6,874,793 | B2* | 4/2005 | Choudhery | 280/5.521 |
| 7,451,024 | B2* | 11/2008 | Brusarosco et al. | 701/29 |
| 7,552,628 | B2* | 6/2009 | Mancosu et al. | 73/146 |
| 7,797,093 | B2* | 9/2010 | Tsukasaki et al. | 701/70 |
| 2005/0247388 | A1* | 11/2005 | Ohsawa et al. | 152/209.9 |
| 2006/0201240 | A1 | 9/2006 | Morinaga | |
| 2007/0240502 | A1* | 10/2007 | Morinaga et al. | 73/146 |
| 2009/0049903 | A1* | 2/2009 | Murakami et al. | 73/146 |
| 2009/0171531 | A1* | 7/2009 | Kitazaki et al. | 701/37 |

FOREIGN PATENT DOCUMENTS

| | | |
|---|---|---|
| EP | 1 541 388 | 6/2005 |
| EP | 1 757 464 | 2/2007 |
| GB | 2 313 347 | 11/1997 |
| JP | A 2005-343281 | 12/2005 |
| JP | 2006-282066 | 10/2006 |
| JP | 2007-91183 | 4/2007 |
| WO | WO 2005/016670 A1 | 2/2005 |
| WO | 2007/123196 | 11/2007 |

OTHER PUBLICATIONS

Japanese Office Action issued in Japanese App. No. 2008-147259, mailed Mar. 15, 2011.

* cited by examiner

*Primary Examiner* — Paul N Dickson
*Assistant Examiner* — Timothy Wilhelm
(74) *Attorney, Agent, or Firm* — Greer, Burns & Crain, Ltd

(57) ABSTRACT

A tire attitude control device comprises: detecting unit that detects the respective ground contact states at two tire measurement positions on the tire shoulder side, each the same distance away from a tire center position in a direction opposite a tire width direction, at the same position in a tire peripheral direction; calculating unit that calculates the respective ground contact lengths at said two tire measurement positions at least once per tire rotation, based on said ground contact states detected by said detecting unit; and control unit that generates, when a ratio of two ground contact lengths calculated by said calculating unit is out of a predetermined range that includes 1, a control signal for controlling a camber angle of a tire so that said ratio approaches 1 and outputs the control signal to said suspension control device.

8 Claims, 6 Drawing Sheets

TIRE WIDTH DIRECTION

TIRE ATTITUDE CONTROL DEVICE AND METHOD

BACKGROUND OF THE INVENTION

The present invention relates to a tire attitude control device and tire attitude control method for controlling the attitude of a rolling tire mounted on a vehicle.

A tire mounted on a vehicle and subjected to a load is affected by the suspension mechanism of the vehicle, resulting in a camber angle that is not equivalent to zero when the tire is in a stationary state. The same holds true in a rolling state. Further, the geometry of the suspension mechanism changes according to the change in load, and this change varies the attitude (camber angle) of the tire. In general, toe-out, where the wheel extends outside the direction of vehicle travel, and a negative camber, where the wheel tilts toward the inside of the vehicle with respect to the direction perpendicular to the contact area of the wheel, tend to occur when a high load is applied.

Thus, since the attitude of a tire changes when mounted on a vehicle, the shape of the tire contact area that contacts the road deviates from a symmetrical shape. Accordingly, the force produced within the tire contact area also exhibits asymmetrical distribution, which causes uneven tire wear.

On the other hand, JP 2005-343281 A describes a method and device for estimating the dynamic state of a tire, and a tire with a sensor.

JP 2005-343281 A describes a method whereby strain gauges are installed on a tire in two locations symmetrical in the width direction using the center position of the tire tread as a reference, ground contact lengths are found from the output waveforms of the strain gauges, and the load, lateral force, and longitudinal force are estimated from the identified ground contact lengths.

However, while this device of prior art estimates items such as the load and longitudinal force applied to the tire, it does not control the attitude of the tire. Accordingly, the device is not capable of suppressing uneven tire wear.

SUMMARY OF THE INVENTION

It is an object of the present invention to provide a device and method capable of controlling the attitude of a tire so as to suppress uneven tire wear.

A tire attitude control device according to the invention comprises:

detecting means that detects the respective ground contact states at two tire measurement positions on the tire shoulder side, each the same distance away from a tire center position in a direction opposite a tire width direction, at the same position in a tire peripheral direction;

calculating means that calculates the respective ground contact lengths at said two tire measurement positions at least once per tire rotation, based on said ground contact states detected by said detecting means; and control means that generates, when a ratio of two ground contact lengths calculated by said calculating means is out of a predetermined range that includes 1, a control signal for controlling a camber angle of a tire so that said ratio approaches 1 and outputs the control signal to said suspension control device.

A tire attitude control method according to the invention comprises the steps of:

detecting the respective ground contact states at two tire measurement positions on the tire shoulder side, each the same distance away from a tire center position in a direction opposite a tire width direction, at the same position in a tire peripheral direction;

calculating the respective ground contact lengths at said two tire measurement positions at least once per tire rotation, based on said detected ground contact states; and generating, when a ratio of two calculated ground contact lengths is out of a predetermined range that includes 1, a control signal for controlling a camber angle of a tire so that said ratio approaches 1 and outputting the control signal to said suspension control device.

DETAILED DESCRIPTION OF THE INVENTION

The following describes in detail a tire attitude control device and method of the present invention based on the embodiment shown in accompanying drawings.

Figure 1:
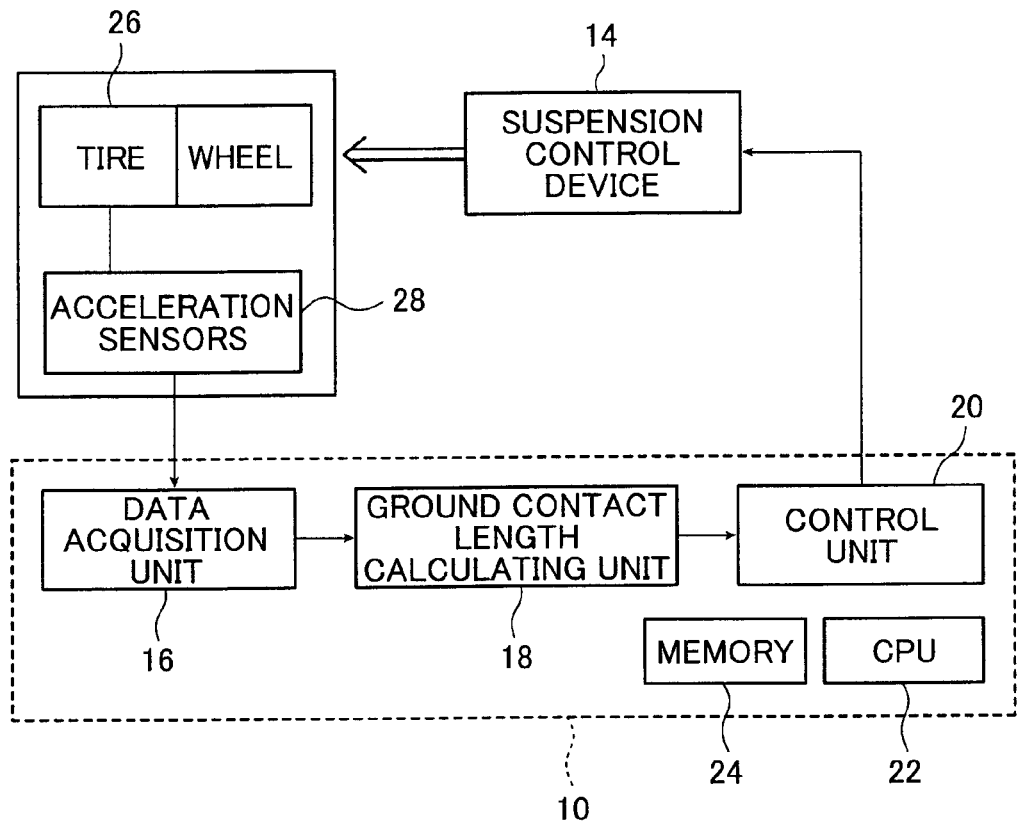
FIG. 1 is a block diagram illustrating the configuration of a main section of a vehicle where a tire attitude control device according to an embodiment of the present invention is mounted.

FIG. 1 is a block diagram illustrating the configuration of a main section of a vehicle where a tire attitude control device 10 according to an embodiment of the present invention is mounted.

The tire attitude control device 10 controls the attitude of a tire so as to maintain a symmetrical shape of the contact area of the tire, even when mechanical characteristics whereby the suspension mechanism of the vehicle changes depending on load, or the lateral force or longitudinal force produced on the contact area of the tire works to change the attitude (camber angle) of the tire.

The tire attitude control device 10 comprises a data acquisition unit 16, a ground contact length calculating unit 18, a control unit 20, a CPU 22 that controls the operation and function of the data acquisition unit 16, the ground contact length calculating unit 18, and the control unit 20, and a memory 24 that stores the conditions, such as threshold values, used by each unit, and the data calculated by each unit.

The data acquisition unit 16 acquires an acceleration signal outputted from acceleration sensors 28 installed on a tire 26. Each of the acceleration sensors 28 detects and outputs the acceleration in a radial direction R, and corresponds to detecting means configured to detect the ground contact state in the present invention. The employed accelerator sensor 28 is, for example, a semiconductor acceleration sensor.

Specifically, the semiconductor acceleration sensor comprises a Si wafer in which a diaphragm is formed within the peripheral frame area, and a base configured to fix the peripheral frame area of this wafer, and is provided with a weight at the center of the diaphragm and a plurality of piezoresistors on the surface of the diaphragm. When acceleration is applied to the weight, the diaphragm changes shape, and this change in shape changes the resistance value of the piezoresistors. A bridge circuit is formed so as to enable detection of this change as acceleration information.

Note, however, that the acceleration sensor 28 is not limited to a semiconductor acceleration sensor as long as the sensor is an acceleration sensor capable of detecting acceleration in the radial direction R of the tire 26.

Figure 2:
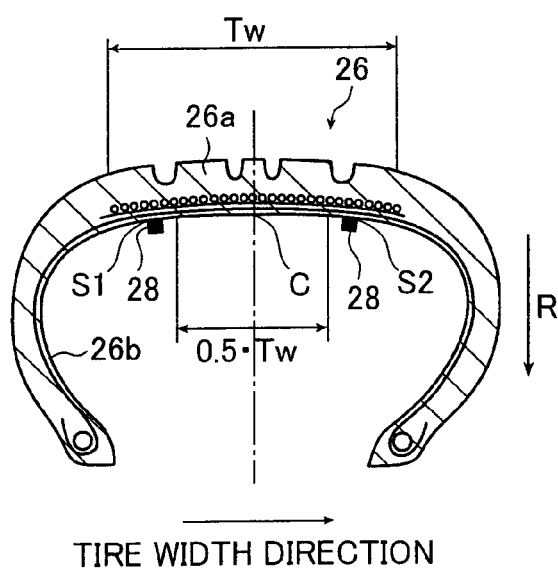
FIG. 2 is a partial cross-sectional view of a tire on which acceleration sensors are installed.

This acceleration sensor 28, as shown in FIG. 2, is provided at each of two tire measurement locations S1 and S2 on the tire shoulder side, each the same distance away from the center position (tire center position) C of a tire tread 26a in the direction opposite the tire width direction, at the same position in the tire peripheral direction, on an inner liner section 26b facing the tire cavity region. With this arrangement, the acceleration sensor 28 is capable of measuring the acceleration of the tire in the radial direction R. Here, when the ground contact width and the ground contact end of the tire width direction of a tire under proper tire load conditions are defined, each tire measurement position is located on the inside at a distance of 10 to 25%, preferably at a distance of 10 to 15%, of the ground contact width from the ground contact end of the tire width direction. That is, given a tire ground contact width Tw, the spacing between the two measurement positions S1 and S2 symmetrical in the tire width direction with respect to the center position C is preferably greater than or equal to 0.5×Tw and less than or equal to 0.8×Tw. The term "proper tire load conditions" refers to the internal pressure conditions of 200 kPa and load conditions equivalent to 85% of the maximum load defined by the Japan Automobile Tire Manufacturers Association (JATMA), Tire and Rim Association (TRA), or European Tire and Rim Technical Organization (ETRTO).

The acceleration signal indicating the acceleration of the tire in the radial direction R outputted from each acceleration sensor 28 is supplied to the data acquisition unit 16. The data acquisition unit 16 comprises an amplifier (not shown) that amplifies the acceleration signals sent from the acceleration sensors 28, and an analog-digital conversion circuit (not shown) that samples the acceleration signals, which are analog data, at a predetermined sampling frequency, and converts the sampled signals to digital data. The data acquisition unit 16 supplies the acceleration data thus converted to digital data to the ground contact length calculating unit 18.

The ground contact length calculating unit 18 calculates the ground contact length. The ground contact length calculating unit 18 performs a smoothing process on the supplied acceleration data using a filter so as to remove noise components and transform the data into acceleration data that smoothly changes, and calculates the ground contact length using this acceleration data.

The filter used for the smoothing process is, for example, a digital filter that sets a predetermined frequency as the cut-off frequency. The cut-off frequency changes according to rolling speed or noise components, and is 0.5 to 2 (kHz), for example, when the wheel speed is 60 (km/hour). Note that a moving average process, trend model, or the like may be used in place of the digital filter to execute the smoothing process.

Figure 3A:
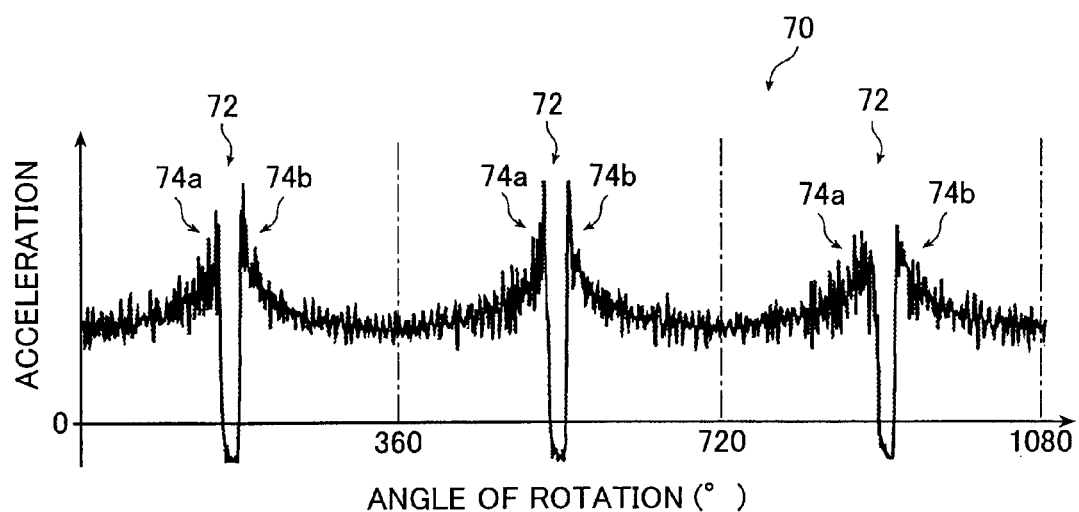
FIGS. 3A and 3B are diagrams respectively illustrating an example of the respective acceleration data obtained by a tire attitude control device.
Figure 3B:
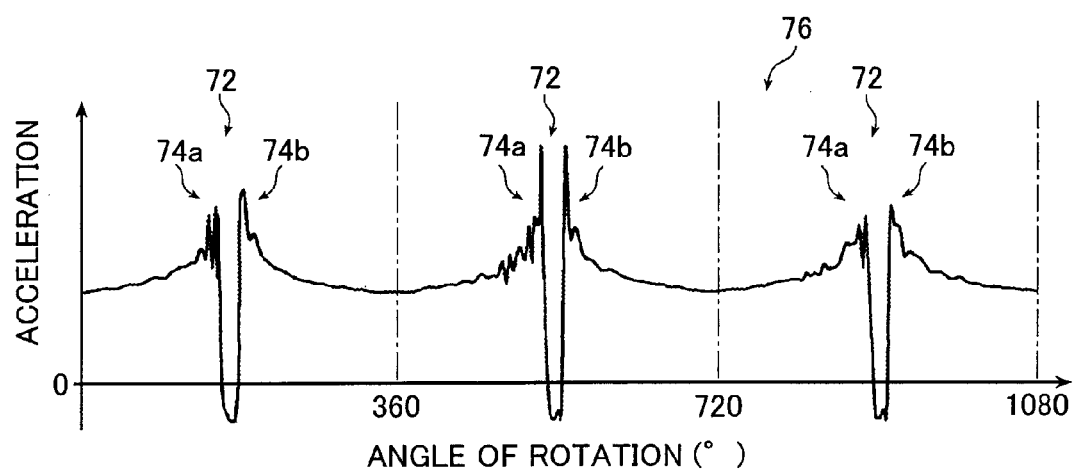

FIG. 3A illustrates an example of acceleration data 70 before the smoothing process, and FIG. 3B illustrates an example of acceleration data 76 after the smoothing process.

Here, as shown in FIG. 3A and FIG. 3B, regions 74a and 74b, where acceleration greatly varies due to tire ground contact deformation, occur during the period of one tire rotation (360° angle of rotation), that is, during a single interval 72. This is because the centrifugal force acceleration component caused by tire rotation suddenly changes when the tire tread rotates and enters the ground contact region and when the tire tread rotates and leaves the ground contact region. Accordingly, of the acceleration data 76, the region 74a in which acceleration suddenly greatly changes can be defined as the ground contact front end region, and the region 74b in which acceleration suddenly greatly changes following this region 74a can be defined as the ground contact rear end region.

Figure 4:
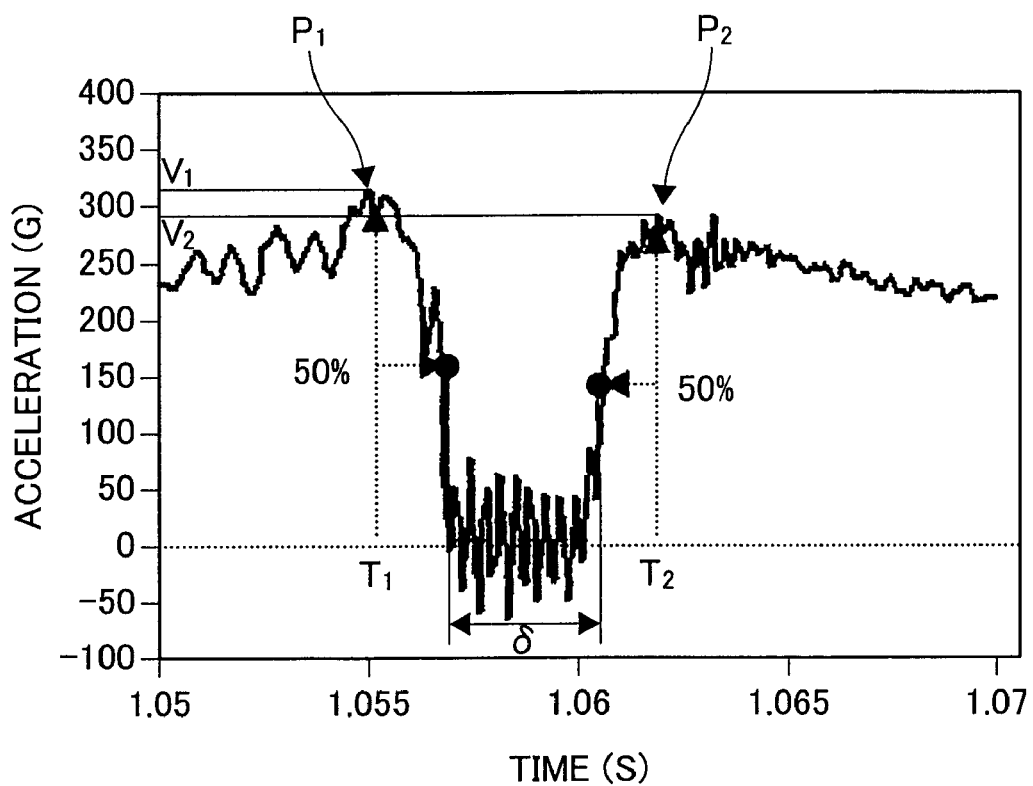
FIG. 4 is a diagram explaining the method of calculating the ground contact length in the embodiment.

FIG. 4 illustrates an example of acceleration data that differ from those of FIGS. 3A and 3B.

As shown in FIG. 4, a leading peak $P_1$ from tire deformation occurs in the ground contact front end region, and a trailing peak $P_2$ from deformation when the tire tread separates from a state of ground contact occurs in the ground contact rear end region.

The ground contact length calculating unit 18 detects the value and position (timing) of the leading peak $P_1$ and the value and position (timing) of the trailing peak $P_2$ in these regions in which acceleration greatly changes. The position of the leading peak $P_1$ refers to the timing at which the leading peak $P_1$ occurs during the period of one tire rotation.

The position of the trailing peak $P_2$ refers to the timing at which the trailing peak $P_2$ occurs during the period of one tire rotation.

In this embodiment, the location in which acceleration is initially greatest during the period of one wheel rotation (the interval 72) is referred to as the leading peak $P_1$. Then, the value at the location where acceleration is initially greatest is referred to as a value $V_1$ of the leading peak $P_1$. Furthermore, the timing at which this leading peak $P_1$ occurs is referred to as a first timing $T_1$.

Additionally, the location where acceleration is once again greatest after the acceleration value decreases following the leading peak $P_1$ is referred to as the trailing peak $P_2$, and the value at the location where acceleration is once again greatest is referred to as a value $V_2$ of the trailing peak $P_2$. The timing at which this trailing peak $P_2$ occurs is referred to as a second timing $T_2$.

In this manner, the change in the value of acceleration during the period of one wheel rotation is examined, and the leading peak value $V_1$ of the leading peak $P_1$ and the trailing peak value $V_2$ of the trailing peak $P_2$ are stored in the memory 24. Furthermore, the first timing $T_1$ of the leading peak $P_1$, and the second timing $T_2$ of the trailing peak $P_2$ are also stored in the memory 24.

The ground contact length calculating unit 18 defines the values equivalent to 50% of the leading peak value $V_1$ and the trailing peak value $V_2$ as a first predetermined value and a second predetermined value, respectively, and finds the time interval δ between the time at which the value of the acceleration data gradually decreases and reaches the first predetermined value and the time at which the value of the acceleration data gradually increases and reaches the second predetermined value. Furthermore, the ground contact length calculating unit 18 finds the ground contact length by multiplying the travel speed of the vehicle found from a wheel speed sensor (not shown) provided near a hub where the wheel is mounted by the identified time interval δ. The acceleration data of the two tire measurement positions S1 and S2 of the tire treads are respectively supplied to the ground contact length calculating unit 18, resulting in the calculation of two ground contact lengths. The calculation of ground contact length performed by the ground contact length calculating unit 18 is performed once per tire rotation, and the calculated value of the ground contact length is supplied to the control unit 20 after each measurement.

Note that while the time interval δ for finding the ground contact length was found using the values equivalent to 50% of the leading peak value $V_1$ and the trailing peak value $V_2$ as the first predetermined value and the second predetermined value, respectively, the present invention is not limited to values equivalent to 50%, and numerical values equivalent to values within a range of 10 to 100% of the leading peak value $V_1$ and the trailing peak value $V_2$ may be used. Additionally, while two acceleration sensors 28 were disposed at a single location in the tire peripheral direction, the two acceleration sensors 28 may be disposed at each of a plurality of positions in the tire peripheral direction. With this arrangement, it is possible to measure the ground contact length a plurality of times per tire rotation.

The control unit 20 calculates the ratio of the two ground contact lengths at the tire measurement positions S1 and S2, and does not generate a control signal for controlling the tire attitude when this ratio is within a predetermined range that includes "1". Here, given that the ground contact length at the tire measurement position that is positioned on the vehicle inside is referred to as the inside ground contact length, and the ground contact length at the tire measurement position that is positioned on the vehicle outside is referred to as the outside ground contact length when the tire is mounted on the vehicle, the ratio of the ground contact lengths is expressed as "inside ground contact length/outside ground contact length". Additionally, the predetermined range that includes "1" is expressed as less than or equal to a preset first threshold value and greater than or equal to a second threshold value, where the first threshold value is a value greater than "1" and is set to a value within the range of 1.1 to 1.5, for example, and the second threshold value is a value less than "1" and is set to a value within the range of 0.5 to 0.9, for example.

On the other hand, when the ratio of the calculated ground contact lengths is greater than the first threshold value, a control signal for executing control so that the camber angle changes in the positive camber (a state in which the tires are inclined in a V-shape when viewed from the front of the vehicle) direction is generated. And, when the ratio of the calculated ground contact lengths is less than the second threshold value, a control signal for executing control so that the tire camber angle changes in the negative camber (a state in which the tires are inclined in an upside-down V-shape when viewed from the front of the vehicle) direction is generated. That is, when the ratio of the calculated ground contact lengths is out of a predetermined range that includes "1", the control unit 20 generates a control signal configured to control the tire camber angle so that the ratio of the ground contact lengths becomes "1".

The suspension control device 14 is a section that adjusts the arm length of the components of the suspension, the movement of the lower arm installation points, and the like so as to control the camber angle of the wheel.

Figure 5A:
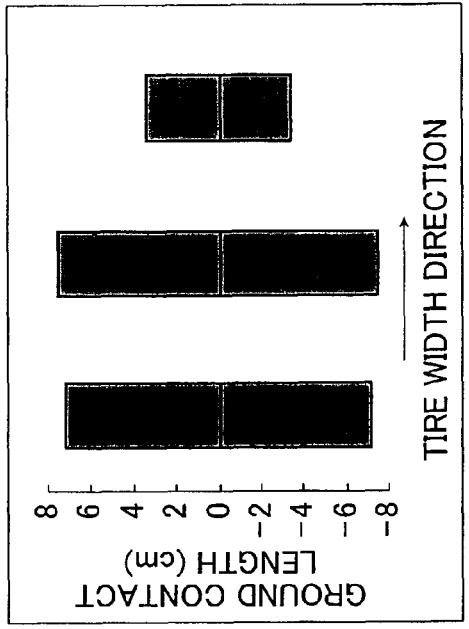
FIGS. 5A to 5D are diagrams illustrating examples of tire ground contact lengths under a plurality of conditions.
Figure 5B:
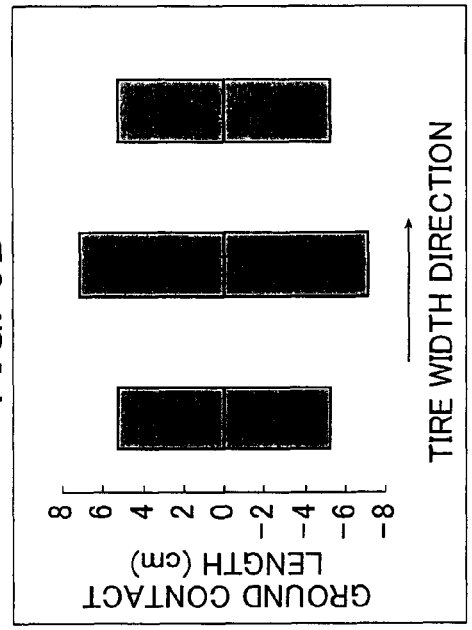
Figure 5C:
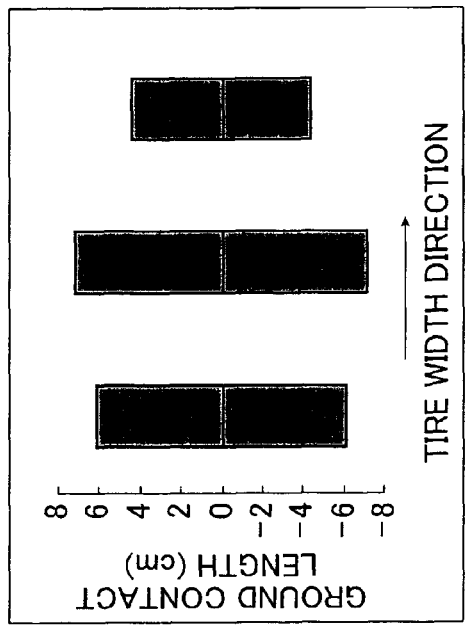
Figure 5D:
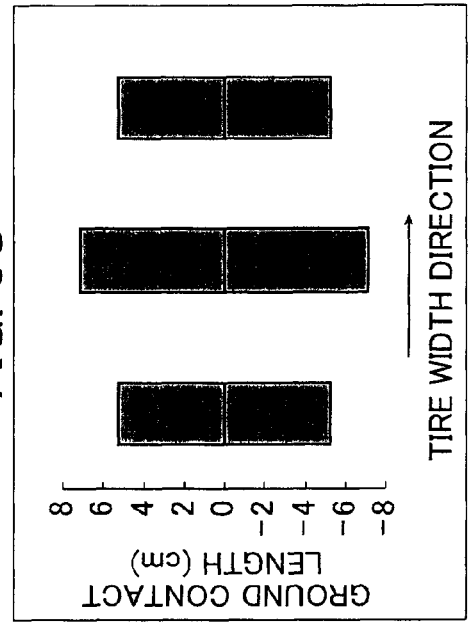

FIGS. 5A to 5D illustrate the results (rolling speed 50 km/hr) when an acceleration sensor is provided to each of the tire measurement positions S1 and S2 and a center position C, as shown in FIG. 2, so as to find the ground contact lengths. FIG. 5A shows the state of slip angle +1 degree. In FIG. 5A, of the ground contact lengths on both sides in the figure, the ground contact length on the left side is long in comparison to the ground contact length on the right side. FIG. 5B shows the state of slip angle +3 degrees. In comparison to the ground contact lengths of FIG. 5A, the ground contact length on the left side in the figure is longer, and the ground contact length on the right side in the figure is shorter. In comparison, FIG. 5C shows the state of slip angle +1 degree, when the camber angle is controlled so that the aforementioned ground contact length ratio equals "1". Similarly, FIG. 5D shows the state of slip angle +3 degrees, when the camber angle is controlled so that the aforementioned ground contact length ratio equals "1". Thus, it is possible to control the asymmetrical shape of the contact area that occurs due to the slip angle so as to form a symmetrical shape.

Figure 6:
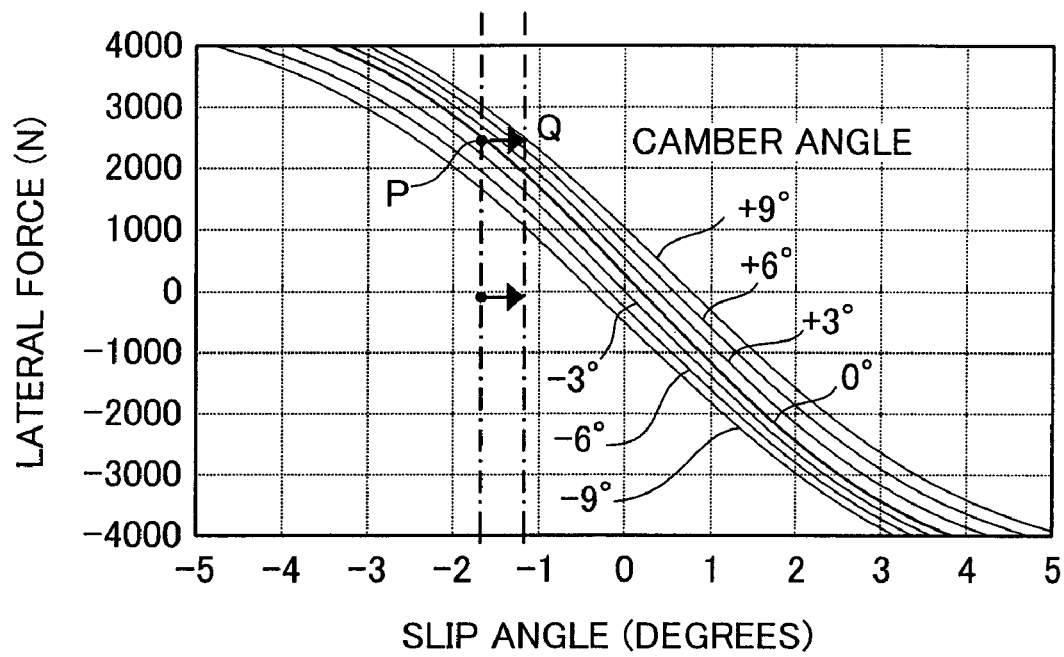
FIG. 6 is a graph showing the relationship between the lateral force produced on a tire and slip angle.

FIG. 6 is a graph illustrating the relationship between slip angle and lateral force when the camber angle is changed to 0 degrees, ±3 degrees, ±6 degrees, and ±9 degrees. When control is performed so that the inside ground contact length/outside ground contact length ratio approaches "1", the shape of the contact area has symmetrical properties, thereby increasing the lateral force. For example, while the contact area at the position of point Q, that is, when the slip angle is −1.2 degrees and the camber angle is +9 degrees, is substantially symmetrical in shape, the lateral force at point Q is the same value as the lateral force when the slip angle is −1.5 degrees and the camber angle is 0, which is at point P. Even when the same lateral force is produced, the slip angle can be reduced by controlling the camber angle so as to make the contact area shape axisymmetric. Thus, when a lateral force is produced, it is possible to suppress the tire wear that readily occurs on one side opposite the center position C in the tire width direction so as to reduce uneven wear.

Figure 7:
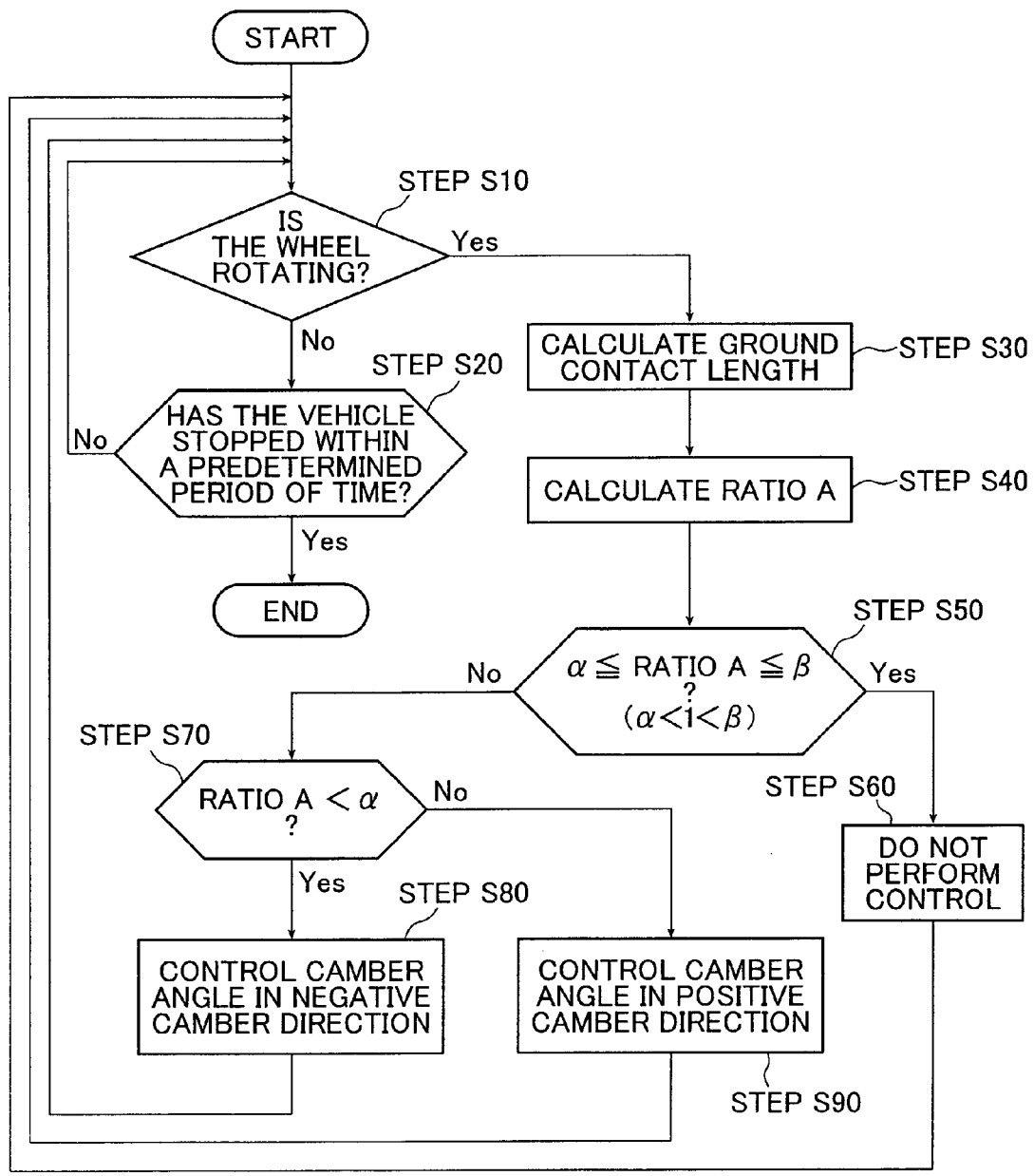
FIG. 7 is a flowchart showing the tire attitude control method.

The following describes the tire attitude control method performed by such the tire attitude control device 10. FIG. 7 is a flowchart showing the tire attitude control method.

First, the ground contact length calculating unit 18 assesses whether the wheel is in a rotating or non-rotating state (step S10). Assessment of the rotating or non-rotating state is performed using a pulse signal supplied from the wheel speed sensor provided near the hub where the wheel is mounted. An extremely low-speed state (10 km/hr or less, for example) is regarded as a non-rotating state, and thus the state is assessed as non-rotating when the number of pulse signals supplied within a predetermined period of time is less than or equal to a certain number.

When the state is assessed as non-rotating, the ground contact length calculating unit 18 then assesses whether or not the vehicle is stopped over a predetermined period of time (10 minutes, for example) (step S20). Whether or not the vehicle is stopped is assessed using a signal of a speedometer provided to the vehicle. When the vehicle is assessed as not having stopped over the predetermined period of time, the flow returns to step S10 and the rotating or non-rotating state of the wheel is once again assessed. On the other hand, when the vehicle is assessed as having already stopped in that predetermined period of time, the tire attitude control method ends.

On the other hand, when the wheel is assessed as rotating in step S10, the ground contact length is calculated (step S30). When the wheel is in a rotating state, acceleration data are continually supplied from the data acquisition unit 16 to the ground contact length calculating unit 18. The ground contact length is calculated using the acceleration data thus supplied. The method for calculating the ground contact length is as described above.

Next, the control unit 20 calculates the ratio A of the inside ground contact length/outside ground contact length (step S40). Next, the calculated ratio A is compared with the preset first threshold value β and second threshold value α. When the comparison result satisfies the condition that the ratio A is greater than or equal to the second threshold value α and less than or equal to the first threshold value β, a control signal for controlling the tire attitude is not generated (step S60).

On the other hand, when the above condition is not satisfied in step S50, the control unit 20 assesses whether or not the ratio A is less than the second threshold value α (step S70). When the ratio A is less than the second threshold value α, control is performed so that the tire camber angle is changed in the negative camber direction (step S80). When the ratio A is not less than the second threshold value α, that is, when the ratio A is greater than the first threshold value β, control is performed so that the tire camber angle is changed in the positive camber direction (step S90).

Subsequently, the flow returns to step S10. Such processing is performed at least one or more times per tire rotation so as to control the tire attitude in real-time.

In this manner, the tire attitude which changes moment-to-moment is controlled so that the tire contact area is axisymmetrical in shape, thereby maintaining a substantially axisymmetrical shape of the tire contact area. Accordingly, a tire lateral force is effectively produced, making it possible to suppress uneven tire wear.

Note that, while the tire attitude control device and method of the present invention has been described in detail above, various improvements and modifications may be made according to the present embodiment without departing from the spirit and scope of the invention, in addition to the above embodiment.

What is claimed is:

1. A tire attitude control device configured to control an attitude of a rolling tire mounted on a vehicle using a suspension control device that adjusts a camber angle of the tire, comprising:
    detecting means that detects the respective ground contact states at two tire measurement positions on the tire shoulder side, each the same distance away from a tire center position in a direction opposite a tire width direction, at the same position in a tire peripheral direction;
    calculating means that calculates the respective ground contact lengths at said two tire measurement positions at least once per tire rotation, based on said ground contact states detected by said detecting means; and
    control means that generates, when a ratio of two ground contact lengths calculated by said calculating means is out of a predetermined range that includes 1, a control signal for controlling a camber angle of a tire so that said ratio approaches 1 and outputs the control signal to said suspension control device,
    wherein said detecting means includes acceleration sensors mounted on a tire inner surface.

2. The device according to claim 1 wherein said control means does not generate said control signal when said ratio is within said predetermined range.

3. The device according to claim 1, wherein:
    said predetermined range is a range less than or equal to a first threshold value set to a value greater than 1, and greater than or equal to a second threshold value set to a value less than 1;
    said control means generates said control signal for changing a camber angle of a tire in a positive camber direction when said ratio is greater than said first threshold value; and
    said control means generates said control signal for changing a camber angle of a tire in a negative camber direction when said ratio is less than said second threshold value.

4. The device according to claim 1 wherein each of said tire measurement positions is set with respect to a ground contact width and a ground contact end of a tire width direction of a tire under proper tire load conditions to a position on the inside in a tire width direction by a distance equivalent to 10 to 25% of said ground contact width from said ground contact end.

5. A tire attitude control method of controlling an attitude of a rolling tire mounted on a vehicle using a suspension control device that adjusts a camber angle of the tire, comprising the steps of:
    detecting the respective ground contact states at two tire measurement positions on the tire shoulder side with acceleration sensors mounted on a tire inner surface, each the same distance away from a tire center position in a direction opposite a tire width direction, at the same position in a tire peripheral direction;
    calculating the respective ground contact lengths at said two tire measurement positions at least once per tire rotation, based on said detected ground contact states; and
    generating, when a ratio of two calculated ground contact lengths is out of a predetermined range that includes 1, a control signal for controlling a camber angle of a tire so that said ratio approaches 1 and outputting the control signal to said suspension control device.

6. The method according to claim 5 wherein said control signal is not generated when said ratio is within said predetermined range.

7. The method according to claim 5, wherein:
    said predetermined range is a range less than or equal to a first threshold value set to a value greater than 1, and greater than or equal to a second threshold value set to a value less than 1;
    said control signal for changing a camber angle of a tire in a positive camber direction is generated when said ratio is greater than said first threshold value; and
    said control signal for changing a camber angle of a tire in a negative camber direction is generated when said ratio is less than said second threshold value.

8. The method according to claim 5 wherein each of said tire measurement positions is set with respect to a ground contact width and a ground contact end of a tire width direction of a tire under proper tire load conditions to a position on the inside of a tire width direction by a distance equivalent to 10 to 25% of said ground contact width from said ground contact end.

* * * * *